United States Patent
Wray et al.

(10) Patent No.: US 11,655,777 B2
(45) Date of Patent: May 23, 2023

(54) PARALLEL INTAKE VALVE TUMBLE FLOW ENGINE

(71) Applicant: Southwest Research Institute, San Antonio, TX (US)

(72) Inventors: Christopher L. Wray, San Antonio, TX (US); Zainal Abidin, San Antonio, TX (US); Kevin L. Hoag, San Antonio, TX (US); Anthony S. Perkins, Shoreham-by-Sea (GB); Ian P. Gilbert, Shoreham-by-Sea (GB); Marc C. Megel, Olathe, CO (US)

(*) Notice: Subject to any disclaimer, the term of this patent is extended or adjusted under 35 U.S.C. 154(b) by 0 days.

(21) Appl. No.: 17/468,016

(22) Filed: Sep. 7, 2021

(65) Prior Publication Data

US 2023/0077310 A1    Mar. 9, 2023

(51) Int. Cl.
*F02F 1/42*    (2006.01)
*F02B 1/06*    (2006.01)

(52) U.S. Cl.
CPC .............. *F02F 1/4235* (2013.01); *F02B 1/06* (2013.01)

(58) Field of Classification Search
CPC ............ F02B 2275/48; F02B 2031/006; F02B 31/085; F02B 2023/106; F02B 2023/108; F02M 35/1085; F02M 35/10262
USPC ....................................... 123/193.5
See application file for complete search history.

(56) References Cited

U.S. PATENT DOCUMENTS

| | | | |
|---|---|---|---|
| 3,903,849 A * | 9/1975 | List ........................ | F02F 1/4214 123/188.14 |
| 4,593,662 A * | 6/1986 | Baring ................. | F01L 13/0005 123/90.39 |
| 4,702,207 A | 10/1987 | Hatamura | |
| 4,945,873 A * | 8/1990 | Kirchweger .......... | F02F 1/4214 123/41.82 R |
| 4,989,561 A | 2/1991 | Hein | |
| 5,161,492 A | 11/1992 | Hitomi | |
| 5,237,974 A | 8/1993 | Isomoto | |
| 5,551,393 A * | 9/1996 | Amano ..................... | F02B 31/04 123/193.5 |
| 5,603,299 A * | 2/1997 | Yuzuriha .................. | F02B 31/00 123/308 |
| 5,640,941 A * | 6/1997 | Hazen ..................... | F02B 31/06 123/430 |
| 5,878,701 A * | 3/1999 | Kahlhamer ............ | F02B 75/042 123/48 A |
| 5,927,246 A * | 7/1999 | Occella .................. | F02F 1/4214 123/302 |

(Continued)

Primary Examiner — Long T Tran
Assistant Examiner — James J Kim
(74) Attorney, Agent, or Firm — Law Office of William F. Ryann

(57) ABSTRACT

An engine with a vertically oriented parallel valve and stem arrangement accommodating tumble flow to support spark-ignited fuel usage. The engine may be provided in a configuration generally suited for swirl flow, compression combustion fuel usage. However, the introduction of a unique, replaceable valve head assembly may be utilized to induce tumble flow within a combustion chamber of the engine. Thus, spark-ignited fuel may be utilized without requiring vast overhaul of the engine to accommodate such fuels. Notably, with the addition of such an assembly, diesel fuel may be replaced with natural gas on large scale equipment without the requirement of impractically burdensome or expensive measures.

16 Claims, 6 Drawing Sheets

(56) References Cited

U.S. PATENT DOCUMENTS

| | | | |
|---|---|---|---|
| 6,065,444 A | 5/2000 | Jingu | |
| 6,250,281 B1* | 6/2001 | Takii | F02F 1/4214 |
| | | | 123/188.14 |
| 6,499,456 B1 | 12/2002 | Nogi | |
| 7,150,267 B2* | 12/2006 | Kuriki | F02F 1/4242 |
| | | | 123/302 |
| 7,249,587 B2 | 7/2007 | Matsuda | |
| 7,878,172 B2* | 2/2011 | Fritz | F02F 1/4235 |
| | | | 123/308 |
| 8,448,616 B2* | 5/2013 | Kirk | F02D 9/02 |
| | | | 123/90.15 |
| 9,068,538 B2 | 6/2015 | Ozeki | |
| 9,657,633 B2* | 5/2017 | Rowells | F02B 31/02 |
| 10,119,427 B1 | 11/2018 | Svegliato | |
| 10,550,807 B2* | 2/2020 | Kim | F02M 35/10288 |
| 11,136,914 B2 | 10/2021 | Lindgren | |
| 2002/0112693 A1 | 8/2002 | Stutz | |
| 2004/0084005 A1 | 5/2004 | Goto | |
| 2005/0081813 A1* | 4/2005 | Irie | F02M 35/1085 |
| | | | 123/193.5 |
| 2015/0345420 A1* | 12/2015 | Han | F01L 1/265 |
| | | | 123/308 |
| 2016/0265420 A1 | 9/2016 | Abe | |
| 2017/0328262 A1 | 11/2017 | Tofukuji | |

* cited by examiner

PARALLEL INTAKE VALVE TUMBLE FLOW ENGINE

BACKGROUND

Over the years, efforts have been undertaken to increase efficiency and output from a variety of different types of internal combustion engines. In this regard, a variety of different factors are taken into account when designing the architectural layout for a given engine. That is, while certain components are generally consistent, such as the use of a piston, intake and exhaust valves, different firing mechanisms and others, the manner in which these components are arranged, oriented and work together may vary widely. Additional factors such as the type of fuel or overall output may also determine the type of engine design best suited for the application at hand. For example, an engine design that is well suited for use in a small motorcycle may be vastly different from the type that is well suited for use in large scale industrial equipment. Furthermore, efforts to decrease emissions to the extent possible plays an ongoing role in current engine designs.

For large scale industrial equipment, transportation vehicles and other high power output applications, diesel fuels are often utilized. In order to attain efficient output from diesel fuel and to handle structural loads of higher peak cylinder pressures, diesel engines generally utilize parallel valve stem architecture. Often, this means that the fuel-air mixture leading to the combustion chamber over the piston is delivered by way of multiple pathways running parallel to one another and likely the chamber itself as well. This may be advantageous for the combustion of diesel fuel because it may provide a relatively high compression ratio to support compression-ignited combustion. Indeed, fuels such as diesel are often referred to as compression combustion fuels. This pattern of vertical or parallel path fuel delivery into the combustion chamber tends to result in a swirling of the air flow. This is an added advantage for the generally slower burning, higher output diesel fuel.

In contrast to the diesel engine, a more conventional gas engine may be preferred where the specific torque requirements from the engine may be somewhat less. For example, a conventional gas engine may be a bit less expensive, less expensive to repair, and the fuel cost is generally more consistent and below that of diesel fuel. Thus, when it comes to transport, for example, it is generally more common to see conventional gas utilized in the everyday vehicle with diesel being reserved for larger trucks, busses or construction equipment.

Another difference when it comes to the conventional gas or spark-ignition engine is the intake valve architecture. That is, rather than arrange intake valves with a primary focus on compression ratios, it is preferable to employ an arrangement that facilitates tumble flow of fuel into the combustion chamber as opposed to a swirl flow. Higher rpm requirements also lead to larger valve sizes relative to bore diameter. This is often facilitated by a pent roof architecture of the cylinder block which angles the intake valves away from the noted parallel arrangement. Tumble flow is more well suited to generating turbulence and increasing the combustion rate of the spark-ignited fuel such as more conventional gasoline.

With the different intake designs and fuel types in mind, particularly in support of larger scale industrial applications, diesel fuel engines utilizing far square designs are generally employed. However, it has been proposed that emissions may be further minimized where more alternative fuel choices such as natural gas are utilized. Unfortunately, current equipment supporting large scale applications tend to employ diesel engines with the above-described parallel valve, swirling flow fuel delivery designs. This is a problem where a spark ignited fuel such as natural gas is sought to be utilized, given that the burn is more efficient and reliable where the flow is best introduced in a tumble type of manner similar to a conventional gas engine.

Presently, operators in possession of diesel engine equipment are not able to simply begin utilizing natural gas for sake of lowering emissions. As suggested, the available engines are not designed to effectively burn natural gas with a tumble flow intake (due to a pent roof design, for example). While a certain degree of retrofit is possible, it is not presently possible to attain a tumble flow from a swirl flow intake design where intake valves are arranged to facilitate diesel fuel combustion as described above. Rather, a complete cylinder head redesign would be required to accommodate a tumble of fuel flow into the combustion chamber. As a result, operators with capital already invested in available diesel engines are unlikely to begin utilizing a natural gas option simply for the sake of lowering emissions. This means that in the case of a traditional city bus, for example, vast amounts of particulate continue to be emitted into the habitable city space on an annual basis. Considering these emissions amplified across an entire bus fleet or even across the country in every major metro area for that matter, and the result of the inability to supply a practical natural gas retrofit for diesel engine applications, is quite significant.

SUMMARY

An engine is provided. The engine includes a multiple intake valve cylinder to accommodate a reciprocating piston with a combustion chamber there-above or there-adjacent. An intake valve assembly is provided with inlets to at least two intake valves of parallel arrangement for delivery of a spark-ignition fuel to the combustion chamber. At least one of these inlets facilitates an angled, substantially non-perpendicular tumble flow of the fuel to the chamber.

DETAILED DESCRIPTION

In the following description, numerous details are set forth to provide an understanding of the present disclosure.

However, it will be understood by those skilled in the art that the embodiments described may be practiced without these particular details. Further, numerous variations or modifications may be employed which remain contemplated by the embodiments as specifically described.

Embodiments detailed herein are directed at a unique architecture and design for attaining a tumble flow of fuel to an engine employing parallel valve stems. As used herein, the term "parallel" is meant to infer that fuel-air mixture directed at a combustion chamber through multiple inlets may be delivered from a valve assembly through one inlet that is arranged substantially parallel to another and in line with a central axis of the chamber. This parallel flow of fuel through multiple inlets is commonly displayed by diesel or other compression combustion engines. However, with the unique inlet valve architecture embodiments described herein, a tumble flow of the fuel may be attained such that engines employing these types architectures may be well suited for spark-ignited fuel use without requirement of a fundamental redesign of the cylinder head. Thus, "parallel" inlet engines, perhaps initially configured for non-spark-ignited fuel use such as diesel, may now be utilized with spark-ignited fuel where a unique corresponding parallel tumble flow assembly is made available.

As used herein, the term spark-ignited fuel includes fuels that are spark-ignited within a combustion chamber above a reciprocating piston head. These may include natural gas, gasoline, propane, fuels with a substantially methane composition and may further include alkanes and/or additional constituents such as carbon dioxide, nitrogen, hydrogen sulfide or helium. More conventional gasoline and propane would also be considered. These fuels might all be considered "spark-ignited" in contrast to compression ignition fuels such as diesel fuel. Regardless, for embodiments herein, so long as a tumble flow valve assembly is available to a parallel inlet engine for use with a spark-ignited fuel, appreciable benefit may be realized.

Figure 1:
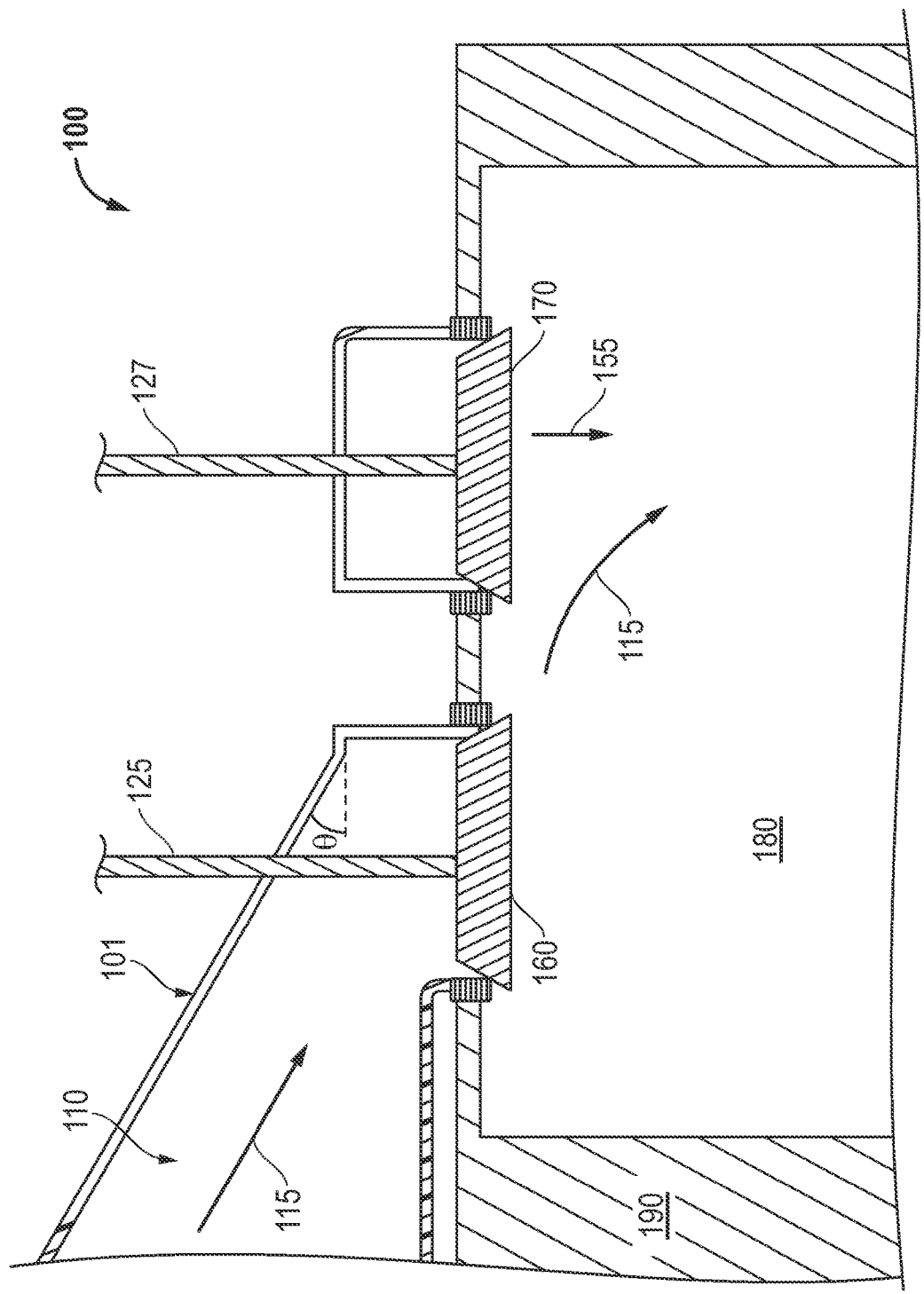
FIG. 1 is a side cross-sectional schematic view of an embodiment of a parallel arranged multi-inlet valve assembly for a tumble flow, spark-ignition fuel engine.

Referring now to FIG. 1, a side cross-sectional schematic view of an embodiment of an engine 100 is shown that accommodates a parallel multi-inlet valve assembly 101. The term "assembly" 101 here is meant to reference the cylinder head channeling architecture that defines the fluid flow paths for the fuel-air mixture 115 to the valves 160, 170. Further, as suggested above, the assembly 101 is "parallel" in that it is of an architecture where a common intake line 110 ultimately supplies an air-fuel mixture to first 160 and second 170 parallel intake valves. The valves 160, 170 themselves are parallel in that they that open and close in a manner that is parallel with a central axis of the combustion chamber 180 (as opposed to traveling in an angled manner as might be expected with a pent roof engine design, for example).

The parallel valve engine architecture illustrated is often found in assemblies which are commonly associated with diesel engines. However, for the present embodiments, the assembly 101 uniquely supports a tumble flow of air-fuel mixture intake as described below which facilitates spark ignited fuel use (e.g. as opposed to diesel or other compression combustion fuel). That is, even though the overall engine 100, cylinder (defined by block 190) and other components remain of a parallel valve intake design, the flow of fuel into the chamber 180 is at least partially tumble in nature to facilitate spark ignition for fuels such as natural gas.

Continuing with reference to FIG. 1, the common intake line or valve 110 of the assembly 100 supplies an initial flow of mixture 115 that is delivered to a first valve 160 by way of an angled channel ($\theta$). In the embodiment shown, the angle $\theta$ is about 30°. In other embodiments, the angle $\theta$ may be anywhere from about 20° to about 45° as measured against a perpendicular orientation such as the top of the block 190 defining the cylinder and combustion chamber 180. Directing this initial flow 115 in an angular manner as described, then in combination with a secondary flow 155 sequentially through the secondary valve 170, leads to a substantially tumbled flow of air-fuel mixture 115, 155 into the combustion chamber 180. Thus, use of a spark ignited fuel such as natural gas may be supported.

The angular delivery may be tailored to also optimize velocity near the spark plug or to avoid structural elements of the cylinder head such as head bolt bosses. Further, the architecture of the assembly 101 may also be configured with other features of the engine 100 in mind such as a generally shallower combustion chamber 180 as is common with vertical stem engines initially configured for compression combustion.

Notice that the unique assembly 101 supports the tumble flow while allowing the parallel valves 160, 170, stems 125, 127 and even the block 190 to remain of a conventional parallel arrangement (e.g. such as for a diesel engine). In the illustrated embodiment, even the secondary flow 155 is delivered in a vertical manner. However, in other embodiments, another angled delivery of this flow 155 may be supported (see FIGS. 3 and 4).

It is of note that the assembly 101 is uniquely configured with angled and/or restrictive inlet channeling to the first valve 160 as described so as to deliver a tumble flow of mixture (e.g. 115, 155) to a block that might otherwise support swirl flow due to valve arrangement. That is, the unique architecture of the assembly 101 is such that tumble flow as described may be induced at an engine 100 otherwise configured for compression combustion, for example, of diesel fuel. However, this same, flat deck, vertical valve stem engine 100, now retrofitted with a change out to a unique tumble inducing cylinder head assembly 101 as described may now make efficient use of spark ignited fuels such as natural gas. No other major engine redesign or replacement may be required.

Figure 2:
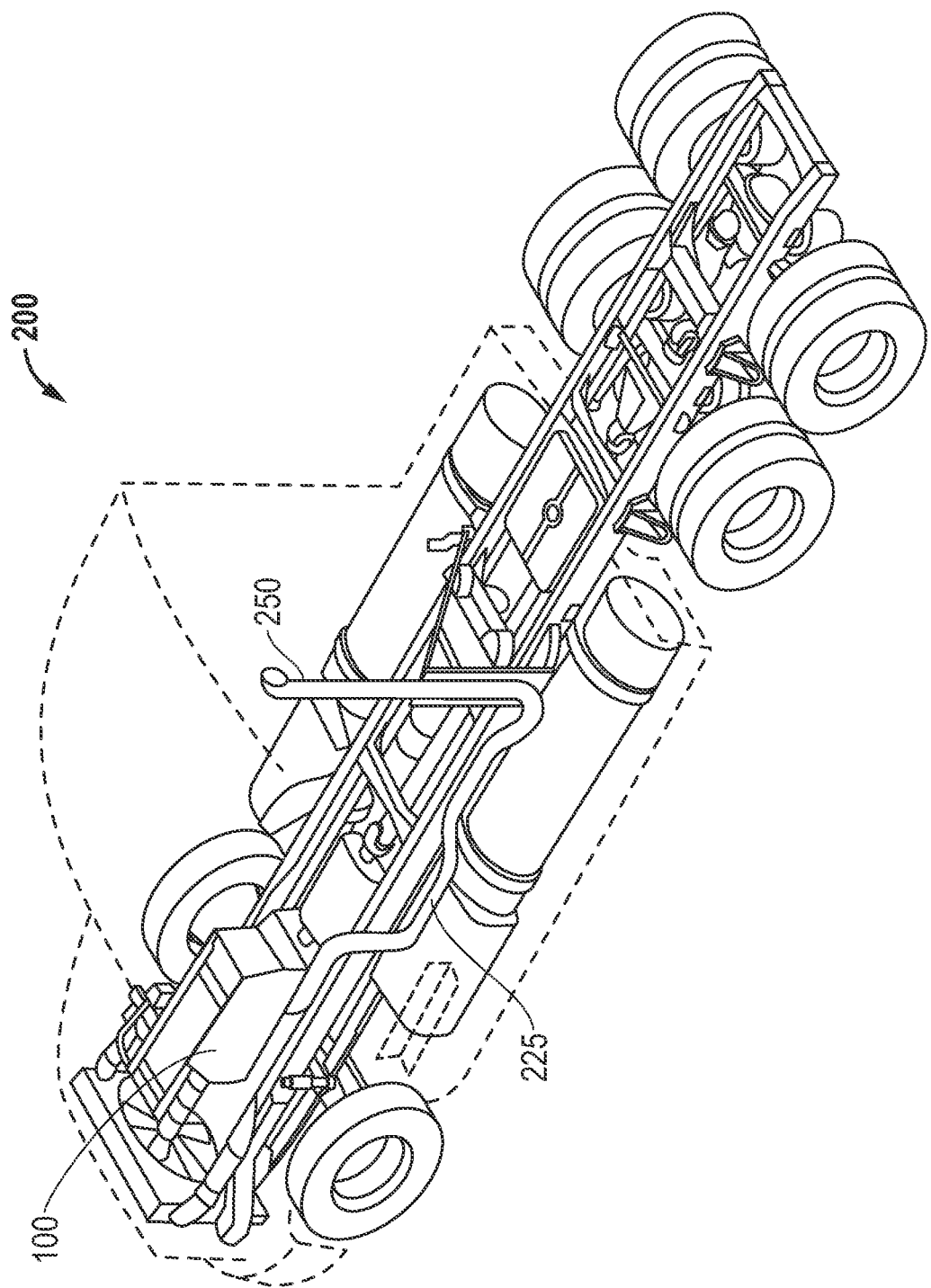
FIG. 2 is a partially sectional perspective view of an embodiment of a vehicle employing the engine of FIG. 1.

Referring now to FIG. 2, a partially sectional perspective view of an embodiment of a vehicle 200 is illustrated that employs the engine 100 of FIG. 1. The vehicle 200 shown is a rig for pulling of cargo. However, any vehicle 200 traditionally powered by a diesel engine such as a city bus, construction equipment or to support other large scale industrial applications, may be envisioned employing the above described engine 100. Once more, the engine 100 may remain substantially the very same traditional diesel engine but for change out of the cylinder head assembly 101 of FIG. 1, rendering the engine 100 non-diesel.

The result of the described changeout means that emissions from the engine 100 via the exhaust inlet 225 and pipe 250 are dramatically limited in terms of particulate. For example, consider a fleet of city busses being converted from traditional diesel to natural gas engines 100, simply by the low cost conversion assembly 101 changeout illustrated in FIG. 1. In a major metropolitan area, this may effectively translate to a conversion from tons of potentially carcinogenic particulate emitted annually to no more than a negligible amount. Overall air quality and clarity might be improved by no more than the noted changeout on a fleet of busses, not to mention the numerous other diesel engine applications that may provide benefit from such a changeout.

Figure 3:
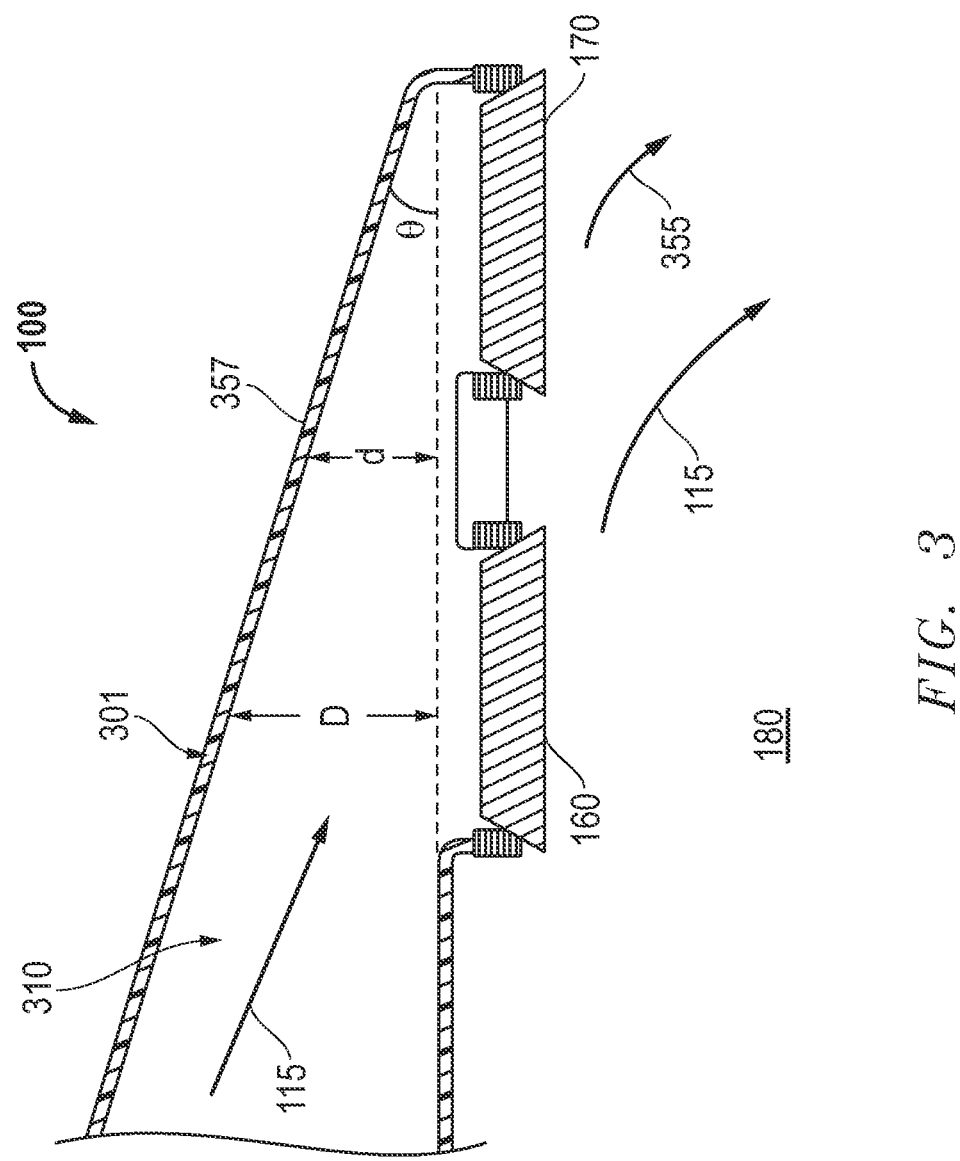
FIG. 3 is a side cross-sectional schematic view of another embodiment of a parallel arranged multi-inlet valve assembly for a tumble flow, spark-ignition fuel engine.

Referring now to FIG. 3, is a side cross-sectional schematic view of another embodiment of a parallel multi-inlet valve assembly 301 is illustrated. In this embodiment, the arrangement is considered "far-square". As with the embodiment of FIG. 1, the assembly 301 is configured for a tumble flow to support a spark-ignition fuel engine 100. For this embodiment, the assembly 301 is "successive" in that it is of an architecture where a common intake valve 310 ultimately supplies air-fuel mixture to first 160 and second 170 intake valves successively (e.g. first to the first valve 160 and next to the second valve 170). However, the assembly 301 uniquely supports a tumble flow of air-fuel intake by way of the angled channel (θ). The assembly 301 remains roughly linear along the channel 310 including to the end portion 357 as illustrated.

Again, in the embodiment shown, the angle θ is about 30° but may be anywhere from about 20° to about 45°. Directing this flow 115 in an angular manner as described, provides a substantially tumbled flow of air-fuel mixture 115, 355 into the combustion chamber 180. This remains the case even with the secondary flow 355 through the secondary valve 170 being somewhat less vertical. Thus, again, use of a spark ignited fuel such as natural gas may be supported, given that with or without restrictive enhancement, the majority of the tumble is facilitated by the angled channel 310 (or 110 in the case of the embodiment of FIG. 1).

As indicated, the embodiments described above support a tumbled flow of the air-fuel mixture through the valves 160, 170. As used herein, the term "tumble" is meant to infer any degree of tumble that is sufficient for supporting spark ignition with spark ignition fuels as noted. This may include a degree of cross-tumble behavior in the flow in the chamber 180. Indeed, this is likely to occur to some extent given the offset nature of the valves 160, 170 for engines 100 that may have been initially designed with an architecture to support a swirl flow for a compression ignition engine. Nevertheless, the unique architecture of the assembly 101, 301 is such that tumble flow may be induced for an engine initially designed for swirl flow and compression ignition.

In another embodiment, the above-described tumble flow is further enhanced by the manner in which the successive supply of mixture is directed through to the second intake valve 170. That is, in addition to the angled flow 115 through the first valve 160, a restrictive flow is applied to the mixture through the second valve 170. That is, in order to reach the end portion 357 of the line for direction to the second valve 170, the mixture may first traverse a restriction of the assembly 101. By way of comparison, the restriction that is presented here between the valves 160, 170 may be of a diameter (d) that is less than about half of the diameter (D) of the portion of the line of the assembly 101 that feeds the first valve 160.

The restriction is such that the flow of air-fuel mixture 355 reaching and traversing the second valve 170 may be of higher velocity and less volume than the tumbling flow 115 through the first valve 160. Additionally, this flow 355 proceeds in a manner that is more independent of the initial flow 115. As a result, the flow of the mixture 155 into the chamber 180 through the second valve 170 is of a more vertical nature as guided by the cylinder wall defining the chamber 180 (as opposed to the more angular delivery illustrated in FIG. 3). Thus, as this flow of air-fuel mixture 355 interacts with the angled flow 115 through the first valve 160, the tumble of mixture into the chamber 180 is further enhanced. As a result, spark igniting of the fuel 115, 155 in the chamber 180 is also further enhanced.

Figure 4:
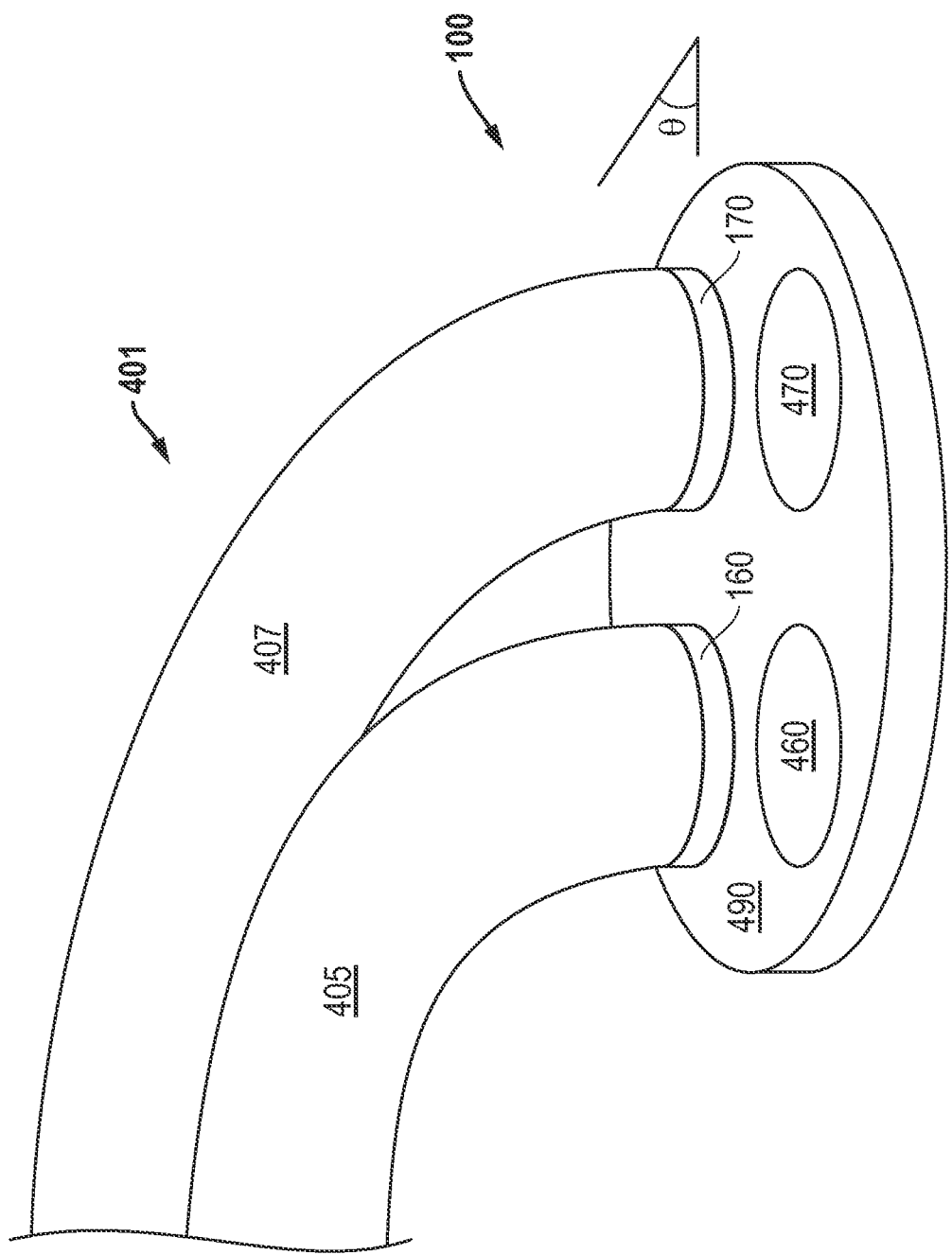
FIG. 4 is a side perspective view of another alternate embodiment of a parallel arranged multi-inlet valve assembly for a tumble flow, spark-ignition fuel engine.

Referring now to FIG. 4, a side perspective view of another alternate embodiment of a successive multi-inlet valve assembly 401 is illustrated. In this view, the vertical parallel stems over the valves 160, 170 are not illustrated but the engine 100 is the same flat head, parallel design as illustrated in FIG. 1. That is, apart from the assembly 401, the same tumble flow, spark-ignition fuel, engine 100 is used. In this case the inlet valves 160, 170 are serviced with air-fuel mixture by separate dedicated intake lines or valves 405, 407. This may be a "near square" configuration similar to FIG. 1 with a fuel mixture reaching each valve 160, 170 at the same time. Although, far square designs may also be used as described above and with reference to FIG. 5A below. Indeed, a diamond arrangement may also be employed (see FIG. 5B described below).

Returning to the perspective view of FIG. 4, the midline angular orientation of the lines 405, 407 is less visibly apparent. However, with reference to the depicted angle (θ), again taken from a substantially horizontal point of reference, each line 405, 407 is roughly angled at about 30°, and may be anywhere from about 20° to about 45°. In one embodiment, the angle (θ) is substantially different between the individual lines 405, 407. For example, one may be at 30° and the other at 35°. Indeed, different combinations of angles (θ), in combination with factors such as mixture flow velocity, volume, fuel type, etc., may be utilized to enhance tumble into the chamber as described herein.

The perspective view of the engine 100 also reveals the offset nature of the intake valves 160, 170 with respect to the portion of the block 490 over the cylinder. As with other successive, swirl design engines, the engine 100 includes exhaust valves 460, 470 adjacent the intake valves 160, 170, even though the assembly 401 is configured to induce tumble in the chamber below as described above.

In one embodiment the intake valves 160, 170 are successive in terms of mixture intake to the chamber below with mixture through the first line 405 to the first valve 160 taking place in advance of mixture through the second line 407 to the second valve 170. Further, with dedicated independent lines 405, 407 available, additional valving within the assembly 401 may be used to adjust or tailor timing of air-fuel mixture delivery as between each valve 160, 170. Thus, tumbling of flow into the chamber below may be enhanced by such a tailored timing technique.

Figure 5A:
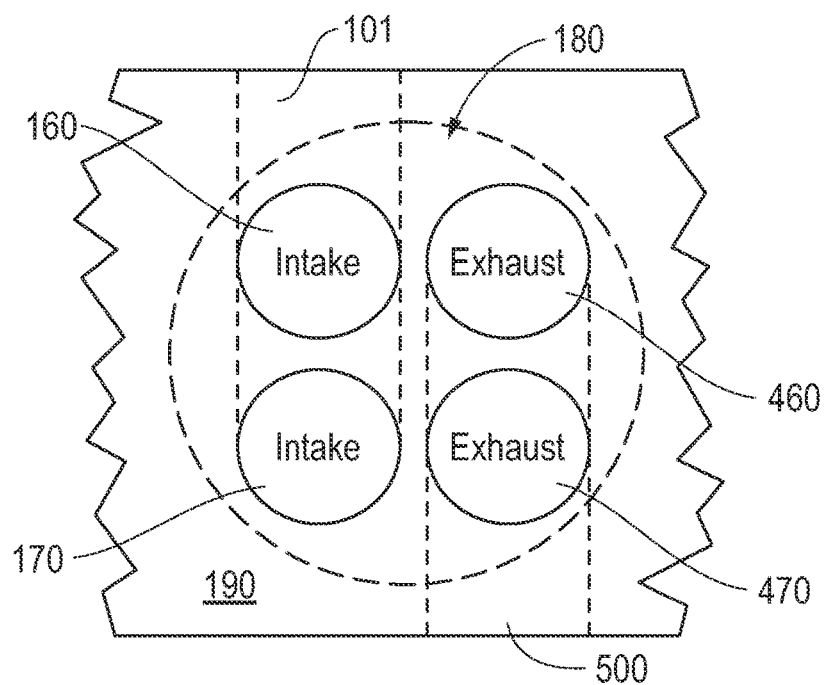
FIG. 5A is a top schematic view of a combustion chamber for a tumble flow, parallel arranged multi-inlet valve assembly of a far-square configuration.
Figure 5B:
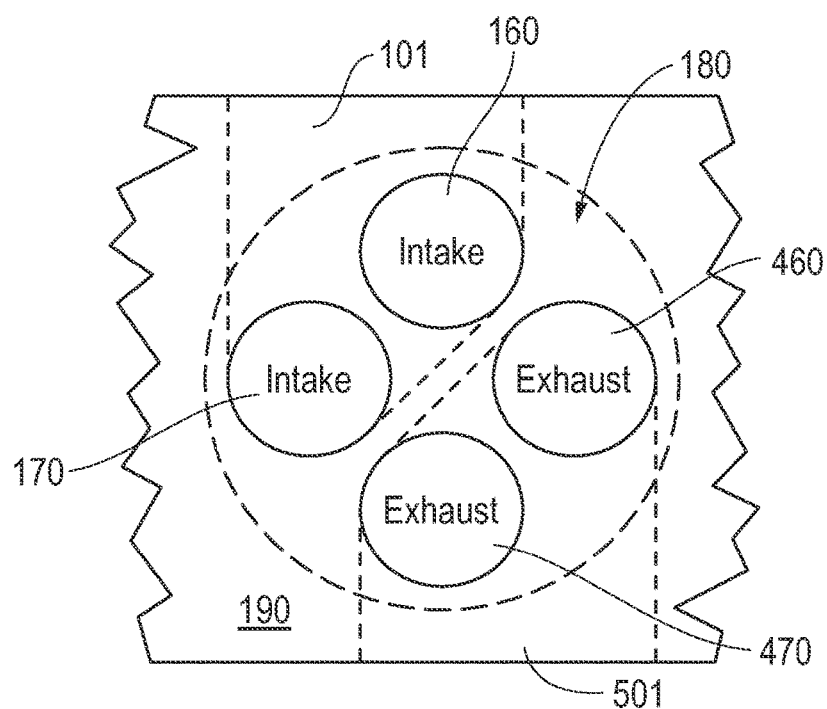
FIG. 5B is a top schematic view of a combustion chamber for a tumble flow, parallel arranged multi-inlet valve assembly of a diamond configuration.

Referring now to FIGS. 5A and 5B, top schematic views of a combustion chamber 180 defined by an engine block 190 are illustrated. The fuel delivery may or may not be successive as indicated. Regardless, a parallel multi-inlet valve assembly 101 is utilized to induce a tumble flow as indicated. In both cases, even though the assembly 101 is of a parallel valve arrangement, a tumble flow of mixture into the chamber 180 for sake of spark ignition is attained due to unique architecture of the assembly 101 as described herein.

FIG. 5A specifically, is a top schematic view of the combustion chamber 180 where the intake valves 160, 170 are successive and of a far-square configuration with the second valve 170 aligned substantially in direct front of the first valve 160 with respect to a midline between the intake 160, 170 and exhaust 460, 470 valves. The assembly 101 is of an architectural design as described above to support tumble flow into the chamber 180 through the intake valves 160, 170 while also shaped to suit the depicted far-square configuration. The same is true of an exhaust valve assembly 500 shape aligned with the exhaust valves 460, 470.

FIG. 5B specifically, is a top schematic view of a combustion chamber 180 where the intake valves 160, 170 are successive and of a diamond configuration with the second valve 170 in front of and offset from the first valve 160 with respect to a midline between the intake 160, 170 and exhaust 460, 470 valves. The assembly 101 is again of an architectural design as described above to support tumble flow into the chamber 180 through the intake valves 160, 170 while also shaped to suit the depicted diamond configuration. Similarly, the same remains true of an exhaust valve assembly 501 shape that is aligned with the exhaust valves 460, 470.

Figure 6:
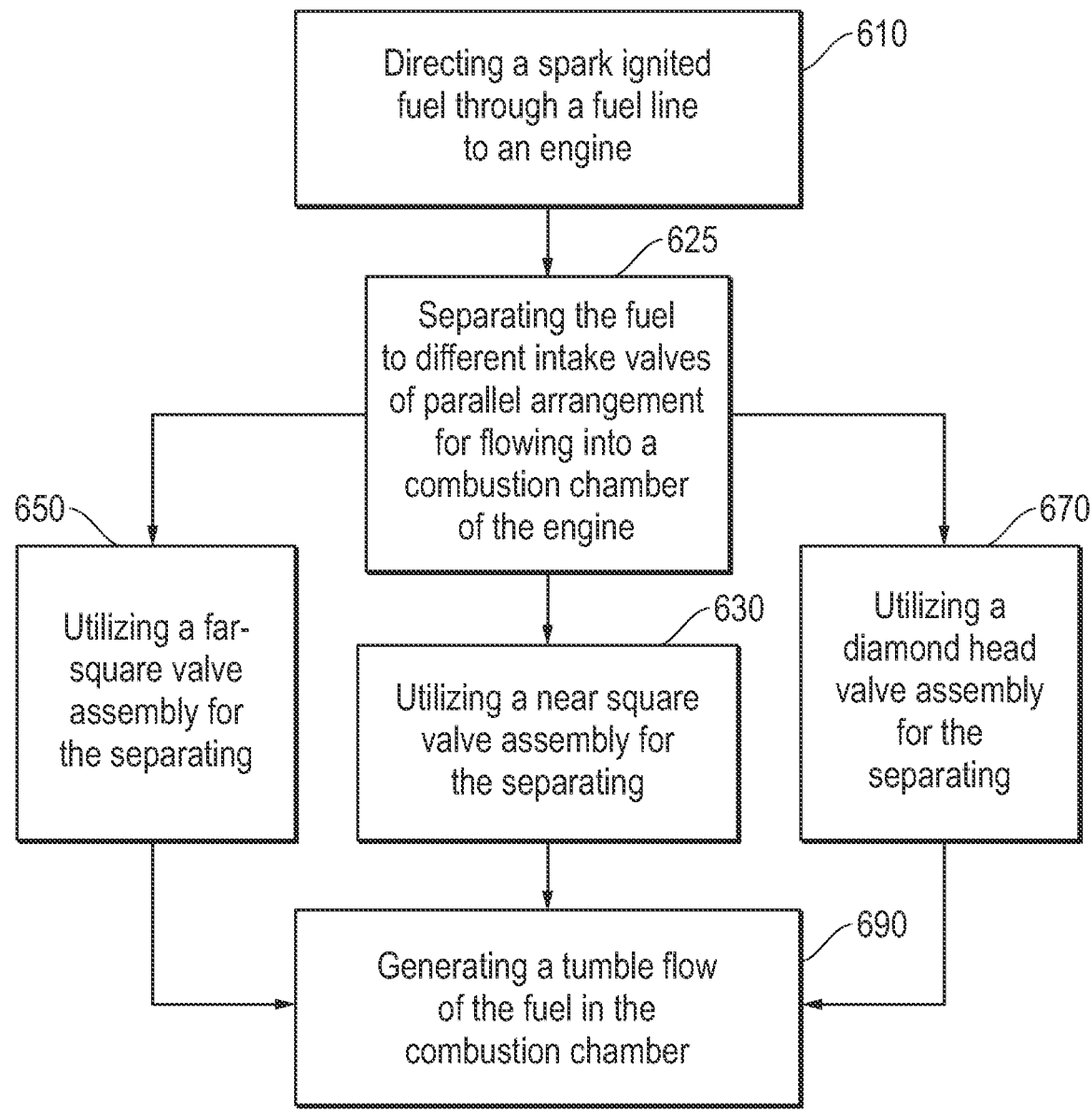
FIG. 6 is a flow-chart summarizing an embodiment of employing a spark-ignition fuel in a tumble-flow manner with a parallel arranged multi-inlet valve assembly engine.

Referring now to FIGS. 6, a flow-chart summarizing an embodiment of employing a spark-ignition fuel in a tumble-flow manner with a parallel multi-inlet valve assembly engine is depicted. Specifically, as the spark-ignited fuel is directed to an engine as indicated at 610 it is separated to different intake valves (see 625). This may be achieved with the vertical valve stem engine being of a far square, near square or diamond configuration as indicated at 650, 630 and 670. Nevertheless, due to unique embodiments of cylinder head assemblies detailed herein, a tumble flow of the air-fuel mixture may be generated in the combustion chamber of the engine sufficient for utilizing the spark-ignited fuel (see 690).

As a practical matter, embodiments described hereinabove include replaceable assemblies that may be used to convert a traditional diesel or other compression combustion engine to a spark-ignited engine. By way of specific example, this means that a diesel engine may be converted to a natural gas engine with little more than a cylinder head changeout. In addition to the tumble flow inducing features of such assemblies as described above, additional tumble enhancements may be employed. For example, the upper portion or "roof" defining the angled channel may include flat elongated regions or "planes". In one embodiment the roof is split into three such planes. However, other configurations may be utilized to enhance tumble generation.

The preceding description has been presented with reference to presently preferred embodiments. Persons skilled in the art and technology to which these embodiments pertain will appreciate that alterations and changes in the described structures and methods of operation may be practiced without meaningfully departing from the principle and scope of these embodiments. Furthermore, the foregoing description should not be read as pertaining only to the precise structures described and shown in the accompanying drawings, but rather should be read as consistent with and as support for the following claims, which are to have their fullest and fairest scope.

We claim:

1. An engine comprising:
    a multiple intake valve cylinder to accommodate a reciprocating piston and define a combustion chamber thereadjacent; and
    an intake valve assembly with inlets to at least two intake valves of parallel arrangement for delivery of a spark-ignited fuel-air mixture to the combustion chamber, at least one of the inlets facilitating an angled, substantially non-perpendicular tumble flow of the fuel-air mixture to the chamber via a channel about the inlets that is angled at between about 20° and about 45° and that is of a reducing diameter from the at least one of the inlets to the other inlet for enhancing the tumble flow.

2. The engine of claim 1 wherein the spark-ignited fuel is selected from a group consisting of natural gas, a substantially methane composition fuel, and a fuel with one of alkanes, carbon dioxide, nitrogen, hydrogen sulfide and helium.

3. The engine of claim 1 wherein the tumbled flow comprises one of a substantially tumbled flow and a cross tumble flow.

4. The engine of claim 1 wherein the intake valve assembly is a replaceable cylinder head.

5. A replaceable cylinder head assembly for a parallel multi-valve engine, the assembly comprising:
    a first inlet to a first port of a combustion chamber of the engine; and
    a second inlet to a second port of the combustion chamber, wherein the first of the inlets facilitates angled, substantially non-perpendicular tumble flow of a spark-ignited air-fuel mixture to the combustion chamber via a channel about the inlets that is angled at between about 20° and about 45° and that is of a reducing diameter from the first inlet to the second inlet to the chamber for enhancing the tumble flow.

6. The assembly of claim 5 wherein an arrangement of the ports is one of a near square, a far square and a diamond arrangement.

7. The assembly of claim 5 further comprising a roof defining at least one of the inlets and a common channel for delivery of the air-fuel mixture to the inlets, the roof comprising at least one flat elongated plane to enhance the tumble flow.

8. The assembly of claim 5 wherein the diameter of the restriction is less than about half of a diameter size of a diameter of the first inlet at a feed of the fuel thereto.

9. The assembly of claim 5 wherein a substantial majority of the tumble in the chamber is generated by the angled first inlet.

10. The assembly of claim 5 wherein the inlets comprise separate independent dedicated lines to the ports.

11. The assembly of claim 10 wherein the inlets are angled at substantially the same angle to the ports.

12. The assembly of claim 10 wherein the inlets are angled at substantially different angles to the ports.

13. A method of generating tumble in a parallel multi-valve engine for use of a spark-ignited air-fuel mixture in a combustion chamber thereof, the method comprising:
    directing the mixture toward the combustion chamber;
    separating the mixture into first and second inlets coupled to first and second vertically disposed parallel intake ports of the engine;
    sequentially delivering the fuel to the first and then second ports with a valve assembly comprising a channel about the inlets that is angled at between about 20° and about 45° to generate a tumble flow of the fuel into the chamber; and
    reducing a diameter of a flow path through the channel from the first to the second inlet to effect flow of mixture into the second port to enhance the tumble flow.

14. The method of claim 13 further comprising angularly directing the flow of air-fuel mixture through at least one of the inlets to at least about 20° for the tumble.

15. The method of claim 13 wherein the first and second inlets comprise independent discrete lines to the ports.

16. The method of claim 15 further comprising tailoring timing of mixture delivery through the discrete lines to the ports relative one another.

* * * * *